(12) United States Patent
Rooney

(10) Patent No.: US 8,417,603 B2
(45) Date of Patent: Apr. 9, 2013

(54) METHODS AND APPARATUSES FOR PROVIDING IMPLIED TRADING INFORMATION

(75) Inventor: Patrick J. Rooney, St. Charles, IL (US)

(73) Assignee: Trading Technologies International, Inc., Chicago, IL (US)

( * ) Notice: Subject to any disclaimer, the term of this patent is extended or adjusted under 35 U.S.C. 154(b) by 304 days.

(21) Appl. No.: 12/783,349

(22) Filed: May 19, 2010

(65) Prior Publication Data

US 2011/0288960 A1    Nov. 24, 2011

(51) Int. Cl.
*G06Q 40/00* (2006.01)
(52) U.S. Cl.
USPC ............................................................. 705/35
(58) Field of Classification Search ....................... 705/35
See application file for complete search history.

(56) References Cited

U.S. PATENT DOCUMENTS

| | | | |
|---|---|---|---|
| 5,812,988 A | 9/1998 | Sandretto | |
| 6,003,018 A | 12/1999 | Michaud et al. | |
| 6,078,904 A | 6/2000 | Rebane | |
| 6,772,132 B1 | 8/2004 | Kemp, II et al. | |
| 6,938,011 B1 | 8/2005 | Kemp, II et al. | |
| 7,039,610 B2 | 5/2006 | Morano et al. | |
| 7,127,424 B2 | 10/2006 | Kemp, II et al. | |
| 7,162,447 B1 | 1/2007 | Cushing | |
| 7,228,289 B2 | 6/2007 | Brumfield et al. | |
| 7,389,268 B1 | 6/2008 | Kemp, II et al. | |
| 7,437,325 B2 | 10/2008 | Kemp, II et al. | |
| 7,548,882 B1 | 6/2009 | Pazner | |
| 7,571,134 B1 | 8/2009 | Burns et al. | |
| 7,765,134 B1 | 7/2010 | Pazner | |
| 7,865,418 B2 | 1/2011 | Uenohara et al. | |
| 7,870,063 B1 | 1/2011 | Pazner | |
| 8,019,673 B1 | 9/2011 | Rooney | |
| 2003/0139989 A1* | 7/2003 | Churquina | 705/35 |
| 2003/0200167 A1 | 10/2003 | Kemp, II et al. | |
| 2005/0192886 A1 | 9/2005 | Wender | |
| 2007/0118457 A1 | 5/2007 | Peterffy et al. | |
| 2007/0198387 A1 | 8/2007 | Uenohara et al. | |
| 2010/0010937 A1 | 1/2010 | Rosenthal | |
| 2010/0017321 A1 | 1/2010 | Callaway et al. | |
| 2011/0055069 A1 | 3/2011 | Pazner | |

OTHER PUBLICATIONS

U.S. Appl. 13/198,674, filed Aug. 4, 2011, Rooney.
Regression Analysis Webpage [online], Wikipedia, Jan. 4, 2007. Retrieved from the Internet: http://en.wikipedia.org/wiki/Regression_analysis.

* cited by examiner

*Primary Examiner* — Olabode Akintola
(74) *Attorney, Agent, or Firm* — McDonnell Boehnen Hulbert & Berghoff LLP

(57) ABSTRACT

Embodiments for providing implied traded information are described herein. An embodiment includes receiving last trade information and using that data to determine an amount of last trade information that is due to implied trading activity. This information may be output using a variety of screens. Other embodiments are also disclosed.

22 Claims, 7 Drawing Sheets

FIG. 7

| 11:26:57 | | E/W | BidQ | AskQ | Prc | |
|---|---|---|---|---|---|---|
| +3 | | | | | 9 | |
| Account | | | | | 8 | |
| 13966 | | | | | 7 | |
| 445 | | S 0<br>W 10 | | 10 | 6 | |
| 25 | | | | | 5 | |
| 1 | 5 | | | | 15 | 4 | |
| 10 | 20 | | | | 3 | |
| 50 | 100 | S 0<br>W 15 | | 35 | 2 | |
| CLR | | | | 100 | 1 | |
| 50 | | | | 75 | 0 | |
| | | | | 20 | -1 | |
| SL | SM | B 0<br>W 10 | | 125 | -2 | |
| IOC | | | | 75 | -3 | |
| Delete All | | | | 20 | -4 | |
| Delete 25 | | | | | -5 | |
| Delete 20 | | | | | -6 | |
| -------□------- | | | | | -7 | |
| P/L | | | | | -8 | |
| | | B 0<br>W 10 | | 10 | -9 | |

700

702

METHODS AND APPARATUSES FOR PROVIDING IMPLIED TRADING INFORMATION

TECHNICAL FIELD

The disclosure of this patent document relates generally to the field of electronic trading, and more particularly, to apparatuses and computer program-implemented methods for providing implied trading information.

BACKGROUND

An electronic trading system includes an electronic matching system for tradeable items, such as stocks, options, and commodities. The electronic trading system often includes an electronic exchange to perform order matching. The electronic exchange also provides, among other things, market data and trade confirmation data to subscribing trading devices. By way of illustration, an electronic exchange in derivatives trading is the CME® Globex® electronic trading platform, which is offered by the Chicago Mercantile Exchange Group; though the inventions described herein are not limited to derivatives trading.

To trade in an electronic trading system, a person (commonly a trader) uses a trading device to receive and electronically process data from the electronic exchange. The trading device generally outputs the data to the person via one or more display screens. The person may also interact with the computer and the data using an input device, such as a mouse or keyboard or both. For example, the person may place orders, modify orders, and delete orders at the electronic exchange using the trading device. Depending on how a trading device is configured, trading with it may require a great deal of the person's attention (e.g., as in manual style trading), require very little or no attention (e.g., as in automated style trading), or somewhere in between.

There are numerous tools currently available that can assist in trading. For example, there are a number of different charts that can be used to illustrate movement in the price of a tradeable object over time. There are a number of overlays that can be superimposed over a chart, for example, resistance, support, trend line, moving average, Bollinger bands, and so on. There are a number of price based indicators and volume based indicators that can be shown along with the other tools. In fact, much time and money have been spent on the tools available today, which many people consider useful for analysis.

Yet, the currently available tool set is still inadequate. That is, for example, some kinds of information like implied trading information, which could be useful to certain traders, are not made available to them. In another example, a number of different tools, where each tool offers a different kind of information, might have to be used collectively to properly analyze a market. Forcing the trader to use a variety of different tools may be cause for unnecessary distraction, which is especially problematic in fast moving markets or when implementing sophisticated trading strategies, for example.

BRIEF DESCRIPTION OF THE DRAWINGS

The following disclosure will be better understood by a person skilled in the art when read in conjunction with the figures which show various example embodiments. The figures are for the purpose of illustrating example apparatuses and methods, but it is understood that the various inventions, described herein, are not limited to the arrangements and instrumentality shown in the figures.

FIGS. 4-7 show example screen shots that provide implied trading quantity according to one or more embodiments.

DETAILED DESCRIPTION

Figure 1:
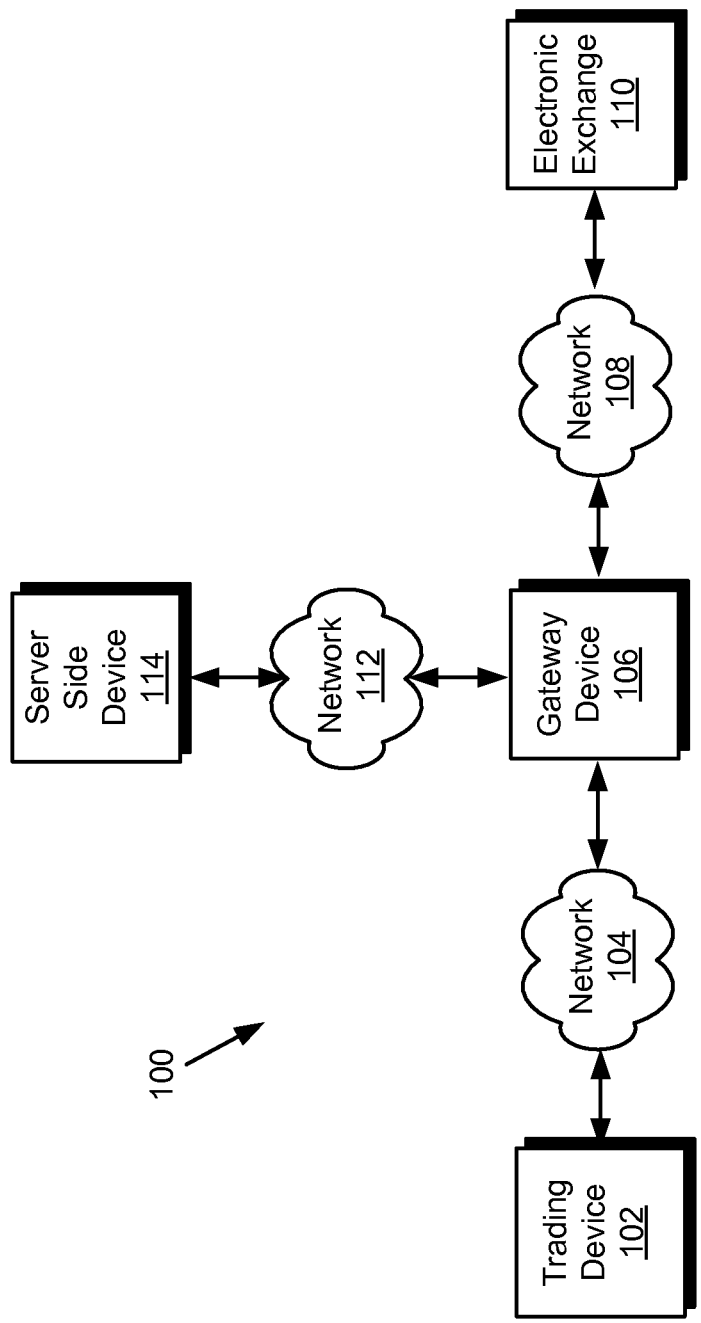
FIG. 1 is a block diagram that illustrates an example electronic trading system upon which one or more embodiments may be implemented.

The disclosure provided herein generally relates to electronic trading, and more particularly, to apparatuses and computer-implemented methods for providing implied trading information. From the example embodiments discussed herein, it will be understood that there are many advantages over the current tools. For example, using one or more embodiments, a person can more quickly determine when implied trading activity occurred, at what price the implied trading activity occurred, or both. In another example, using one or more embodiments, a person can more quickly determine what percentage of the trading activity was implied versus direct. Knowing more about implied trading activity, or being able to assimilate it faster, using one or more embodiments may enable a person to spot market opportunities more quickly and act on them before the opportunity disappears. As such, there are benefits to the actual information being offered, and more importantly in some instances, there are benefits to how this actual information is presented to the end-user.

Before explaining any further, it is worth noting again that the various inventions are not limited in their application to the details of design and the arrangement of the components set forth in the following description or illustrated in the drawings.

I. EXAMPLE ELECTRONIC TRADING SYSTEMS AND APPARATUSES

FIG. 1 is a block diagram that illustrates an example electronic trading system 100 upon which one or more embodiments may be implemented. Trading system 100 includes a trading device 102 and an electronic exchange 110. The system 100 may include additional, different, or fewer components. For example, as shown in FIG. 1, the system 100 may also include, among other things, a gateway device 106 and a server side device 114. According to the example trading system 100 of FIG. 1, trading device 102 is in communication with gateway 106 via network 104, and gateway 106 is in communication with electronic exchange 110 via network 108. Server side device 114 is in communication with gateway device 106 via network 112. Networks 104, 108, and 112 may be a part of the same network, may each include a different network, or some combination thereof. Further, networks 104, 108, and 112 may include, for example, any of a local area network ("LAN"), a wide area network ("WAN"), a virtual private network ("VPN"), Internet, an Internetwork, a wireless network, a combination of network types, and so on. It is understood that electronic trading system 100 may include additional trading devices, gateways, server side devices, and exchanges. Furthermore, additional networks may be used for communication. For example, the trading device 102 may be in communication with the server side device 114 via a network that is different than the network 104 or network 112.

By way of illustration, trading device 102 may include one or more electronic computing platforms such as a hand-held computer device, a laptop, a desktop computer, a workstation with a single or multi-core processor, a server with multiple processors, and/or a cluster of computers, for example. Trading device 102 may be used to trade one or more tradeable objects listed at electronic exchange 110.

A "tradeable object" refers to anything that can be traded with a price, a quantity, or both price and quantity. For example, financial products such as stocks, options, bonds, futures, currency, warrants, funds derivatives, commodities, and collections or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread. A tradeable object may also include traded events or goods, for example.

Figure 2:
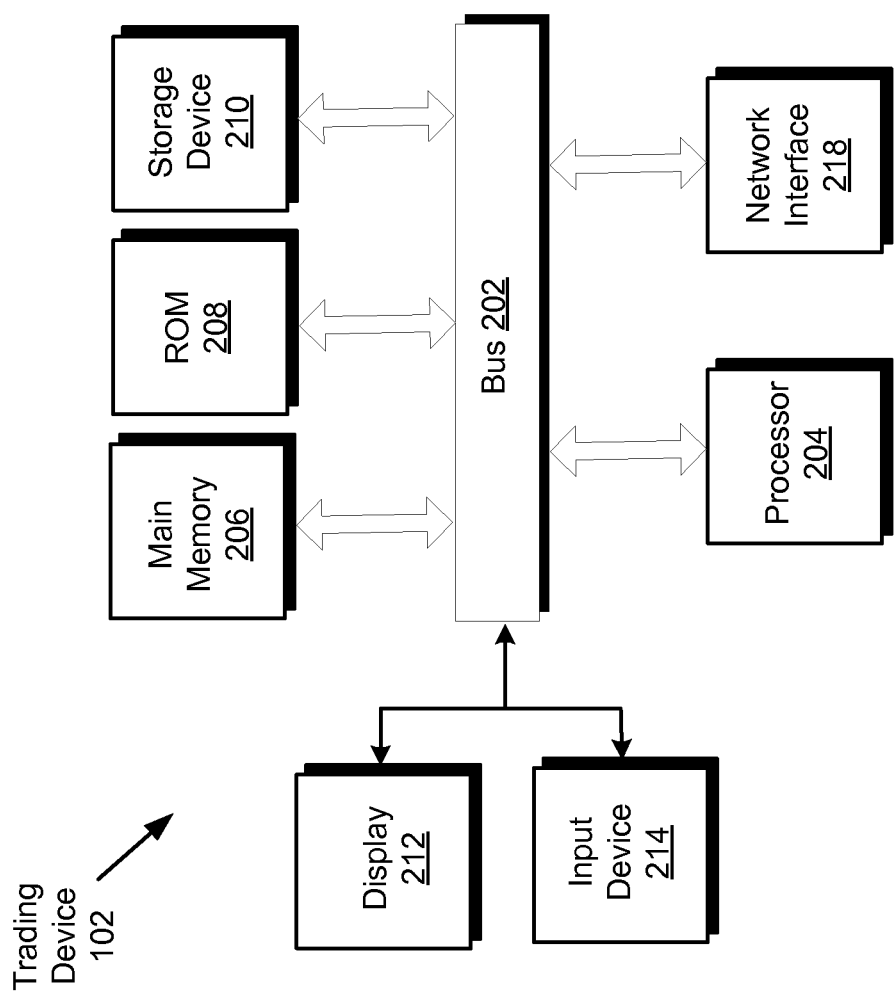
FIG. 2 is a block diagram that illustrates an example computer system upon which one or more embodiments may be implemented.

FIG. 2 is a block diagram that illustrates more detail of trading device 102 upon which an embodiment may be implemented. Trading device 102 includes a bus 202 or other communication mechanism for communicating information, and a processor 204 coupled with bus 202 for processing information. Trading device 102 also includes main memory 206, such as random access memory ("RAM") or other similar storage device, coupled to bus 202 for storing information and instructions to be executed by processor 204. Main memory 206 also may be used for storing variable or other intermediate information during execution of instructions to be executed by processor 204. Trading device 102 further includes a read only memory ("ROM") 208 or other similar storage device coupled to bus 202 for storing information and instructions for processor 104. A storage device 210, such as a magnetic disk or optical disk, may be provided and coupled to bus 202 for storing information and instructions.

Trading device 102 may include or be in communication with a display 212. For example, the processor 204 may be coupled via bus 202 to the display 212, such as a cathode ray tube ("CRT"), a liquid crystal display ("LCD"), a plasma display, a projector, or some other type of display, for displaying information to a user. An input device 214, including a keyboard, a mouse, a trackball, a combination thereof, or some other type of input device, is coupled to bus 202 for communicating selections to processor 204 and for controlling cursor movement on display 212.

According to an embodiment, implied quantity information is provided by trading device 102 in response to processor 204 executing one or more sequences of one or more instructions contained in main memory 206. Such instructions may be read into main memory 206 from another computer-readable medium, such as ROM 208, storage device 210, or both. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to perform the steps described herein. Thus, the embodiments may not be limited to any specific combination of hardware circuitry and software.

The term "computer-readable medium" as used herein refers to any medium that participates in providing instructions to processor 204 for execution. Such a medium may take many forms, including, but not limited to, nonvolatile and volatile media. Nonvolatile media include, for example, optical or magnetic disks, such as storage device 210. Volatile media include dynamic memory, such as main memory 206. Common forms of computer-readable media include, for example, floppy disk, a flexible disk, hard disk, magnetic tape, any other magnetic medium, a CD-ROM, DVD, any other optical medium, a RAM, a PROM, an EPROM, a FLASHEPROM, any other memory chip or cartridge or any other medium from which a processor can read.

In addition, various forms of computer-readable media may be involved in providing one or more sequences of one or more instructions to processor 204 for execution. For example, the instructions may initially be on a remote computer. The remote computer can load the instructions into its memory and send the instructions over a network to trading device 102. Trading device 102 can receive the instructions and place it on bus 202. Bus 202 carries the data to main memory 206, from which processor 204 retrieves and executes the instructions. The instructions received by main memory 206 may optionally be stored at ROM 208 and/or on storage device 210 either before or after execution by processor 204.

Referring back to FIG. 1, gateway 106 may include one or more electronic computing platforms such as a hand-held device, laptop, desktop computer, workstation with a single or multi-core processor, server with multiple processors, and/or cluster of computers, for example. Gateway 106 may be configured to facilitate communication between trading device 102 and electronic exchange 110. For example, gateway 106 may receive market data from exchange 110 via network 108, translate it, and transmit the market data to trading device 102 via network 104. Similarly, gateway 106 may receive messages from trading device 102 via network 104, translate it, and transmit the messages to exchange 110 via network 108. Gateway 106 may also be configured to facilitate communication between server side device 114 and electronic exchange 110.

Server-side device 114 may include one or more electronic computing platforms such as a hand-held device, laptop, desktop computer, workstation with a single or multi-core processor, server with multiple processors, and/or cluster of computers, for example. Similar to trading device 102, server-side device 114 might be configured to perform trading functions. A possible advantage of using server-side device 114 is that data can be computed at a single location (or at a reduced number of locations) and then disseminated to a number of trading devices (only one of which is shown in FIG. 1). Another possible advantage of using server-side device 114 is it can be placed near or at exchange 110, which may result in reduced travel times for messages communicated between exchange 110 and server-side device 114 that are time sensitive (e.g., a trade order message). It is understood that aspects of the embodiments described here may be performed by server-side device 114 instead of at trading device 102, or in addition to trading device 102. That is, server-side device 114 may perform data processing and then disseminate that data to trading device 102 (and to other trading devices, if so desired). In addition, while FIG. 2 refers to trading device 102, it may also represent an embodiment of server-side device 114, for example. Server-side device 114 may also be configured to communicate with trading device 102.

Referring back to FIG. 1, electronic exchange 110 is configured to match trade orders to buy and sell tradeable objects. The tradeable objects may be listed for trading by exchange 110. The orders may include orders that originated from trading device 102 and/or server-side device 114, for example. Exchange 110 is also configured to provide market data to subscribing devices. Depending on the exchange and/or tradeable object traded, market data may include data that represents, among other things, any of the following: (1) the inside market, where the inside market is the lowest sell price and the highest buy price at a point in time; (2) quantities available at the inside market; (3) prices and quantities for orders that are away from the inside market; (4) last traded price ("LTP") and the last traded quantity ("LTQ"); (5) whether the LTQ is implied; and (6) order fill information.

In one or more embodiments, exchange 110 might refer to an internal matching system, where orders (of usually a smaller subset of traders) are matched internally. In one or more embodiments, exchange 110 might refer to an electronic communication network ("ECN").

While not shown for the sake of clarity, in certain embodiments, system 100 may include other devices that are specific to the communications architecture such as middleware, firewalls, hubs, switches, routers, exchange-specific communication equipment, modems, security managers, and/or encryption/decryption devices. Further, while FIG. 1 provides an overview of an example electronic trading system 100, it is understood that the embodiments described herein are not limited for use in the electronic trading system(s) described herein, but rather may be used in any type of electronic trading system where certain data described below is available.

II. EXAMPLE PROCESSES FOR PROVIDING IMPLIED TRADING QUANTITY

Figure 3:
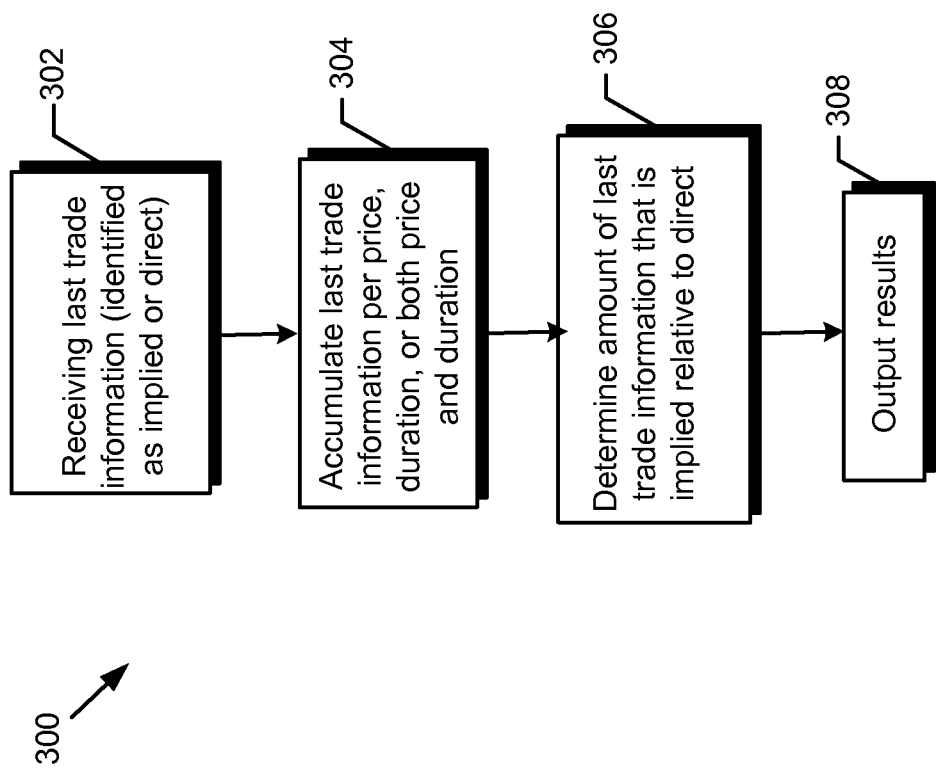
FIG. 3 is a flow chart for providing implied trading quantity according to one or more embodiments.

FIG. 3 is a flow chart 300 for providing implied trading quantity according to one or more embodiments. Flow chart 300 may be software-implemented, hardware-implemented, or a combination of both. For purposes of illustration, flow chart 300 may be implemented by a component(s) or system. As described above, the system may include, for example, any of trading device 102, gateway device 106, server side device 114, or a combination of devices 102, 106, and 114.

Step 302 includes receiving last trade information by the system. In one or more embodiments, last trade information includes a last traded quantity ("LTQ") and a last traded price ("LTP"). In an embodiment, information, such as LTQ and LTP, may be subscribed to by any of a trading device 102, gateway device 106, and server side device 114. According to the embodiment, electronic exchange 110 may provide LTQ and LTP, or alternatively (or in addition to), another computer device such as gateway device 106, server side device 114, and trading device 102 may derive LTQ and LTP from data obtained from exchange 110.

For example, electronic exchange 110 might provide LTQ and LTP in its data feed to subscribing devices. Subscribing devices may include computer devices that are configured to receive the data feed, such as trading device 102. LTQ may provide how much quantity traded or was matched in the previous trade. For instance, an LTQ of "30" says that a quantity of "30" contracts just traded. Often, a last traded price is included along with LTQ. Using the example above, the last traded quantity might have been matched at a price of "125," for example. So, in sum, the last trade was "30" contracts at a price of "125." Soon thereafter, exchange 110 might provide another LTQ and LTP. This typically happens throughout a trading session as trades occur at exchange 110. This information may be received by any of trading device 102, gateway device 106, and server side device 114.

In another embodiment, LTQ and LTP may be derived by a computer device such as trading device 102, gateway device 106, and server side device 114 using other kinds of data from exchange 110. For example, LTQ and LTP could be determined in some instances from order fill information. That is, if an order of "20" contracts filled at a price of "345," then a trade could be recorded of "20" contracts at a price of "345." Though, in some embodiments, order fill information may be limited to the actual orders placed through trading device 102, gateway device 106 (and therefore order fill information may be available for a group of trading devices), and server side device 114. In another example, LTQ and LTP could be determined (or estimated) in some instances from changes in market depth. In some embodiments, LTQ and LTP may be derived using other kinds of data, such as order fill information, in addition to LTQ and LTP offered by exchange 110; this might be done, among other reasons, to verify and/or provide an even more accurate representation of last trade quantity that exchange 110 might otherwise provide.

In an embodiment, the LTQ and LTP are identified as implied or direct. An implied trade is based on at least one or more implied prices, whereas a direct trade is based on all direct prices, more of which is described below.

In an embodiment, exchange 110 might provide whether the LTQ/LTP is an implied trade or a direct trade. It is understood that this information may be inferred by the receiving device if necessary; for example, if exchange 110 identifies the trade as direct, then it can be assumed that the trade is not implied, or alternatively, if exchange 110 identifies the trade as implied, then it can be assumed that the trade is not direct. According to the embodiment, exchange 110 might provide this data in its data feed to subscribing devices. The receiving computer device may then identify the trade as either implied or direct. In another embodiment (or in addition to the exchange providing this data), a computer device, such as trading device 102, gateway device 106, server side device 114, may identify the trade as implied or direct. That is, the computer device may track (or estimate) which trades are based on implied prices and/or which trades are based solely on direct prices.

By way of illustration, a direct price is the price of an explicit (or real) order and an implied price is a price that is generated from real orders in outright contracts and spreads. Implied prices generally come from spread trading. A spread strategy may involve buying one or more tradeable objects and selling one or more tradeable objects. The legs of a spread are the underlying tradeable objects of the spread. For example, in the April/May Crude Oil spread, the April tradeable object is a leg of the spread and the May tradeable object is a leg of the spread. The legs of a spread are sometimes referred to as the underlying or outright.

There are two types of implied prices: an "implied-in" and an "implied-out."

An implied-in price is computed based on leg prices, which imply into the spread price. For instance, to calculate an implied-in price for the bid spread price, subtract leg 2 ask price from the leg 1 bid price (Implied spread bid=leg 1 bid−leg 2 ask). If market conditions were such that leg 1 can be sold at 6000 and leg 2 can be bought at 6011, then the implied bid would be −11. If exchange 110 disseminates an implied −11 spread bid and a trader hits the −11 bid, then the matching engine at exchange 110 would fill three orders: (1) the spread bid at −11; (2) a bid in leg 1 at 6000; and (3) an ask in leg 2 at 6011. Note here that the first order (the spread bid at −11) is a trade executed on an implied price, where the other two orders are trades executed on a direct price. Similarly, an implied-in price for the ask spread price is calculated by subtracting leg 2 bid price from leg 1 ask price (Implied spread ask=leg 1 ask−leg 2 bid). If market conditions were such that leg 1 can be bought at 6001 and leg 2 can be sold at 6010, then the implied ask would be −9. Again, if exchange 110 disseminates an implied −9 spread ask and a trader lifts the −9 ask, then the matching engine would fill three orders: (1) the spread ask at −9; (2) an ask in leg 1 at 6001; and (3) a bid in leg 2 at 6010. The spread ask at −9 would be considered a trade executed at an implied price, where the other two orders would be considered trades executed at a direct price.

An implied-out price is computed based on a spread price and one or more leg prices. For instance, to calculate an implied-out price for a leg 1 ask price, add leg 2 bid price to the spread bid price (Leg 1 bid price=spread bid price+leg 2 ask price). If market conditions were such that leg 2 can be sold for 6509 and the spread can be sold for −9, this implies that leg 1 can be sold at 6500 to complete the order (that is, an implied bid in leg 1 is 6500). Note that a trade in leg 1 at 6500 would be executed at an implied price, whereas the other two orders would be executed at direct prices. Similarly, to calculate an implied-out price for leg 2, subtract the spread ask price from the leg 1 ask price (Leg 2 bid price=leg 1 ask price−spread ask price). If market conditions were such that leg 1 can be sold for 6400 and the spread ask is −10, then this implies that leg 2 can be sold at 6410 to complete the order (that is, an implied bid in leg 2 is 6410).

Implied prices may also be computed from other implied prices. A "generation" may be used to describe how far away the implied price is from a direct price. For example, first generation implieds are composed only on direct prices. Second generation implieds call for a first generation implied price and at least one direct price, and so on. In general, an implied generation is the sum of the implied generations plus one—e.g., a third generation may call for a second generation implied price plus a direct price, or a third generation may call for two first generation implied prices plus a direct price. In an embodiment, implied quantity is the minimum quantity shared between the prices used to compute the implied price. For example, if market conditions were such that leg 1 has a bid quantity of 150 and leg 2 has an ask quantity of 50, then a spread between them would have a spread bid quantity of 50 (the minimum).

In an embodiment, a computer device such as trading device 102, gateway device 106, and server side device 114 may compute implied prices and quantities using the equations provided above, for example. This can be done in addition to receiving implied data from exchange 110 or if exchange 110 did not offer such data.

At step 304, last trade information is accumulated by the system. It may be accumulated by price level, over a period of time for all or some price levels as an aggregate value, or a combination of by price level for a specific duration (e.g., duration might include the time between open and close of a single trading session, the last hour, the last fifteen minutes, and so on). How the information is accumulated may be hard-coded or input by the user.

If the last trade information is accumulated by price level, for example, then the quantity associated with each trade that occurs at a particular price level is added together. To illustrate, assume that there was a trade of "35" contracts at a price "750," then there was a subsequent trade of "15" contracts at "750." The system may add "35" and "15" to arrive at "50" contracts traded at "750." If after several more trades, the exchange matches yet another "10" contracts at "750," then the total traded quantity for "750" is "60."

If the last trade information is accumulated over a period of time for all or some price levels as an aggregate value, for example, then the quantity associated with each trade during the period of time is added together. To illustrate, assume that the trades occurred, as shown in the example above, and that the exchange further matched "425" contracts at "730," "735," "740," and "745." Then, the total quantity traded for that time period is "485." Time periods may be configured to include the current trading session, the last hour, the last fifteen minutes, or the last minute, for example. Time periods may be hard-coded or input by the user.

If the last trade information is accumulated by price level, for example, then it may also accumulated by time (price and time). For example, a time may be configured to include the current trading session, the last hour, the last fifteen minutes, the last minute, and so on. In addition, the system may keep track of a number of different time periods; for example, the system might track last trade information over the current trading session and the last hour. Time periods may be hard-coded or input by the user.

At step 306, a determination is made by the system regarding the amount of the accumulated last trade information is implied relative to direct. This may be implemented by comparing the quantity of contracts traded that were identified as implied versus direct. Step 306 may be skipped if the output includes a total value, for instance (e.g., a trade quantity of "350" at price "6700" was implied; this does not call for making a comparison between implied and direct trade quantity).

At step 308, the results may be outputted on display 112 or some other display in communication with any of trading device 102, gateway device 106, and server side device 114. Output might include a percentage of implied only, a percentage of implied and direct, total traded quantity values for implied, total traded quantity values for direct, or a combination thereof.

For example, an output might include: 10% of the LTQ at "700" was implied; 15% of the LTQ at "705" was implied; 9% of the LTQ at "710" was implied.

In another example, an output might include: 10% implied, 90% direct at "700," 15% implied, 85% direct at "705," 9% implied, 91% direct at "710."

In yet another example, an output might include: traded quantity of "300" at "700" was implied; traded quantity of "450" at "705" was implied; "276" at "710" was implied.

In another example, an output might include: traded quantity of "3000" at "700" was direct; traded quantity of "3000" at "705" was direct; "3067" at "710" was direct.

Some more illustrative examples are provided below.

III. EXAMPLE OUTPUT

Figure 4:
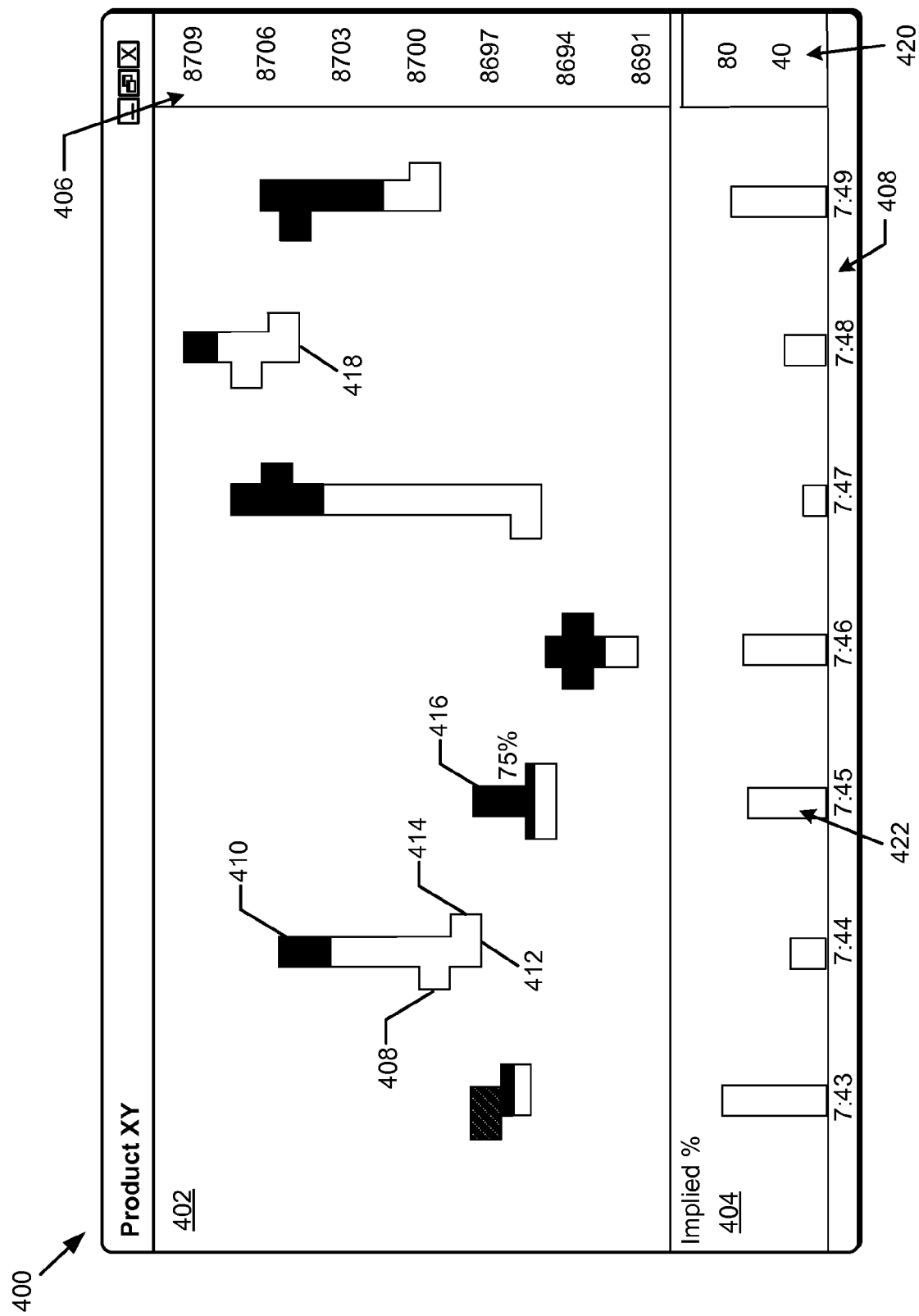

FIG. 4 shows a chart 400 as it might be displayed via display 212 to a user, according to an embodiment. To illustrate how implied quantity information may actually be displayed, chart 400 shows two different regions of output. In particular, region 402 shows one kind of bar chart and region 404 shows a different kind of bar chart. These kinds of charts may displayed together (as they are in FIG. 4), or separately, if so desired.

The bar chart shown in region 402 is a type of chart used to illustrate movements in the price of a tradeable object over a given time interval. Particularly, axis 406 shows price levels and axis 408 shows time intervals. Price levels are shown in graduated units of "3" and the time intervals consist of one-minute intervals; although such details may be configured by the user. This kind of chart may be referred to a candlestick chart or an open-high-low-close chart. That is, each line on the chart shows the highest and lowest prices over one unit of time. Tick marks project from each side of the line indicating the opening price on the left and the closing price for that time period of the right. Other kinds of graphical indicators may be used to display similar types of information (e.g., a Japanese candlestick chart).

Looking closer at a particular indicator, one can tell how much of the trading activity was implied versus direct by looking to how much of the indicator is shaded (implied) versus not shaded (direct). For example, according to graphical indicator 416, nearly three-fourths of the trading activity during that time unit was due to trades that occurred at implied quantity. However, according to graphical indicator 418, approximately one-third of the trading activity during that time unit was due to implied quantity. Of course, there are other mechanisms for providing this kind of information by the use of color, shading, and so on. For example, a color gradient, or a combination of color gradients, could be used to color a particular indicator based on how much traded quantity is implied. Also, a number that represents the actual traded quantity or a percentage due to implieds may be displayed in relation to each bar; a percentage value is shown as an example in relation to indicator 416, in which 75% of the traded quantity is due to implied trading. Combinations of these mechanisms may also be used. For example, a numerical value may be displayed in addition to the shading.

In an embodiment, if a graphical indicator is currently being generated on the display, the system can be programmed to display the implied quantity information relative to the actual size of the indicator. As the time period draws closer to an end, the implied quantity information can grow or shrink with the dynamic indicator to accurately reflect how much trading activity is implied versus direct.

The bar chart shown in region 404 is a type of chart used to illustrate a percentage of implied trading information for a unit of time. Particularly, axis 420 shows percentage levels and axis 408 shows time intervals (also used by chart displayed in region 402). Percentage levels are shown in graduated units of 40 and again the time intervals consist of one-minute intervals; although such details may be configured by the user. Each indicator (such as indicator 422) shows a percentage of implied trading activity for a particular time unit.

Figure 5:
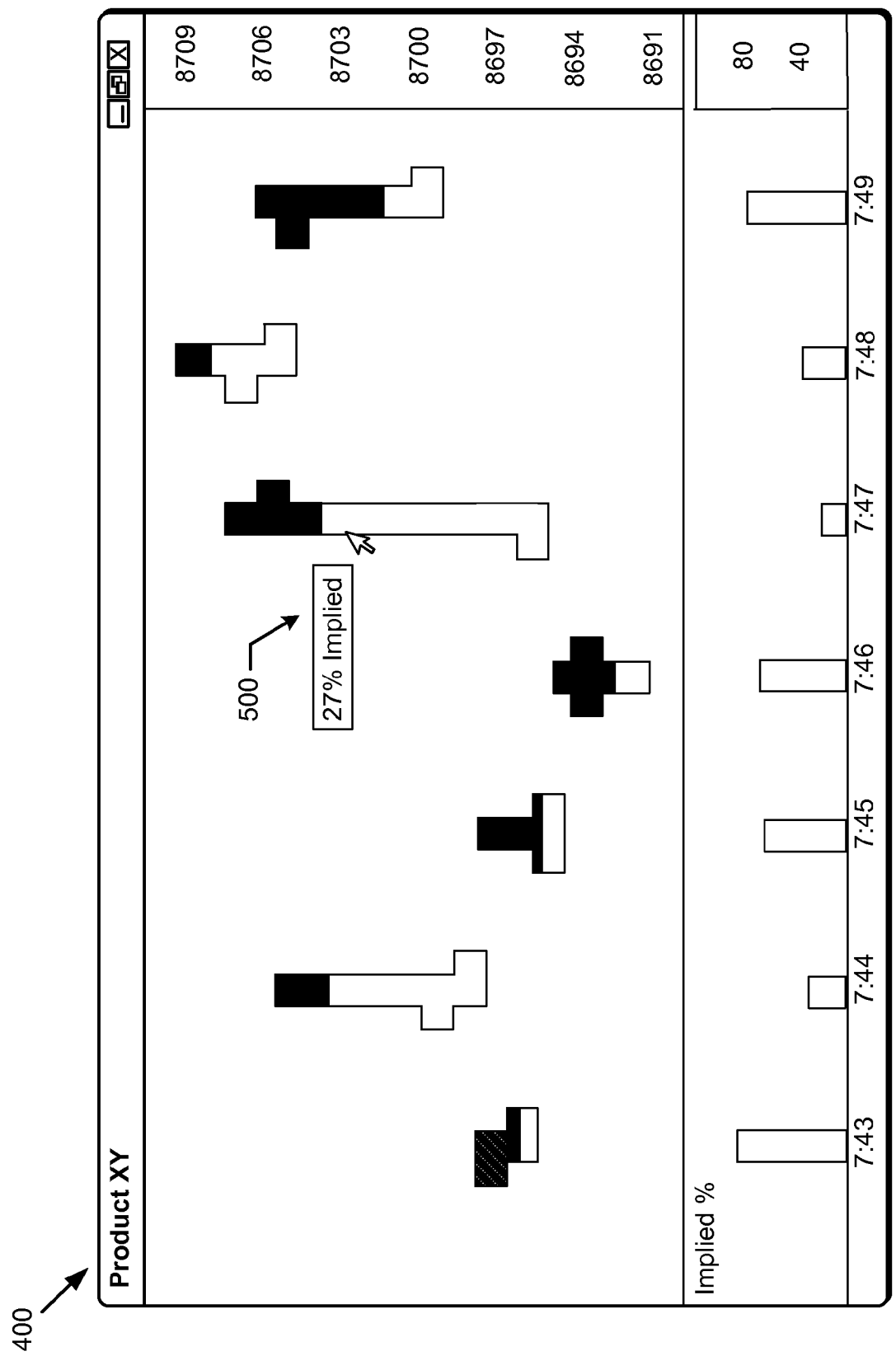

FIG. 5 shows chart 400, but includes a feature that provides more detailed information regarding implied traded quantity. Particularly, upon hovering a cursor of a user input device (like a mouse, trackball, or arrow keys of a keyboard) over a graphical indicator, a more detailed summary of the amount of implied quantity (or direct quantity, or both) is provided. Here, at 500, the cursor is placed over graphical indicator 502 and a pop-up window shows that 27% of the trading activity can be attributed to implieds. The detailed summary may also be displayed in an output field, for example, in the margin of a trading screen or anywhere on the trading screen. This feature may be used in combination with the features described in relation to FIG. 4 (and as shown in FIG. 5), or alternatively, the feature may be used by itself.

The mechanisms (e.g., shading, numbers, colors, etc.) used to indicate how much traded quantity is implied or direct may be continuously or periodically displayed. For example, in an embodiment, the mechanisms and features may always be displayed. However, in an alternative embodiment, the mechanisms and features may periodically be displayed. As an illustration of periodically displaying the mechanisms and features, the shading of the graphical indicator 418 of FIG. 4 may be displayed based on a time value (e.g., shading may be displayed every 10 seconds for a 5 second interval) or user input (e.g., shading may be displayed only when a cursor hovers over the graphical indicator 418).

Figure 6:
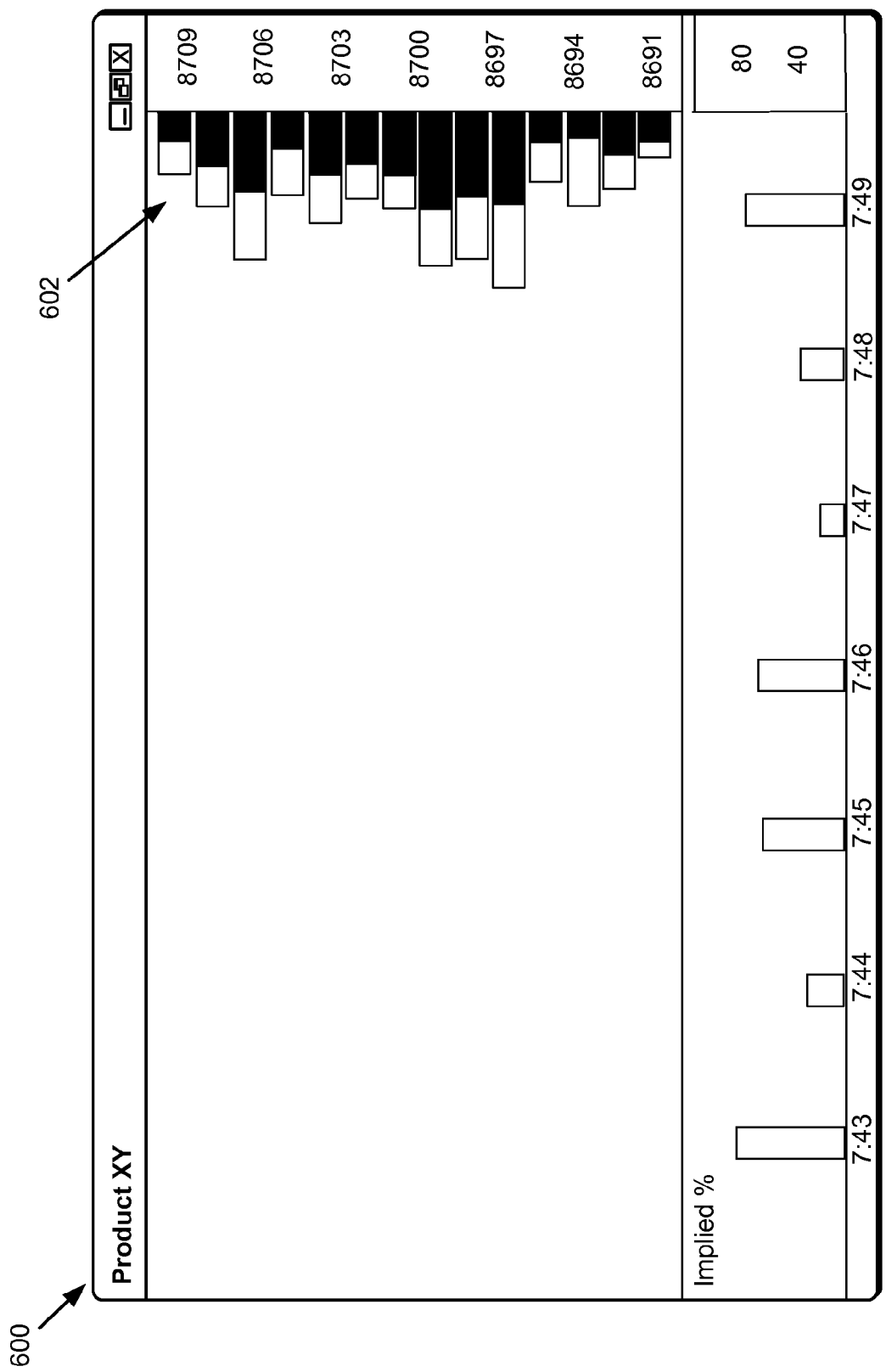

FIG. 6 shows chart 600, which is yet another example way to provide implied traded quantity information. Here, bars 602 are provided at price levels where trading activity has occurred. Thus, it is possible for only one bar to be displayed (indicating that trading has occurred at the single price) or for a plurality of bars to be displayed. Each bar 602 may provide the total quantity traded at a particular price level. Chart 600 builds on that concept by graphically providing an indication of the amount of the total quantity traded is due to implieds. Bars 602 may indicate the quantity information for a predetermined period of time. For example, over the course of a trading session, for the last hour, for the last fifteen minutes, and so on.

FIG. 7 shows a trading screen that resembles an MD Trader trading screen that is commercially offered by Trading Technologies International, Inc. However, the trading screen is adapted to provide implied quantity information. Particularly, similar to chart 600, bars 702 shown in FIG. 7 are displayed at price levels for which trading activity has occurred (or is occurring). Each bar provides an amount of the trading activity that is due to implieds in addition to the amount of the trading activity that is due to direct trading activity.

IV. CONCLUSION

The patent document describes herein a number of inventions that relate to providing implied quantity information. For example, using one or more embodiments, a trader or analyst (or some other end-user) may quickly view and process when implied trading activity occurred, at what price the implied trading activity occurred, or both. In another example, using one or more embodiments, a trader or analyst, for example, can more quickly figure out how much of the trading activity was implied versus direct. Knowing more about implied trading activity, or being able to assimilate it faster, using one or more embodiments may enable a person to spot market opportunities more quickly and act on them before the opportunity disappears. As such, there are benefits to the actual implied trading information being offered, and more importantly in some instances, there are benefits to how this actual information is presented to the end-user. That is, for example, integrating the implied trading information with tools already used by traders and/or analysts, such as in charting and trading screens.

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

What is claimed is:
1. A method including:
   displaying by a computing device a chart, wherein the chart includes a value axis and a time axis;
   receiving by the computing device market data for a tradeable object;
   determining by the computing device an open value for a time interval, a close value for the time interval, a high value for the time interval, and a low value for the time interval based on the received market data;

determining by the computing device a total quantity traded for the time interval based on the received market data;

determining by the computing device an implied quantity traded for the time interval based on the received market data;

determining by the computing device an implied quantity percentage based on the implied quantity traded and the total quantity traded; and displaying by the computing device an indicator on the chart in relation to the value axis and the time axis, wherein the indicator represents the open value for the time interval, the close value for the time interval, the high value for the time interval, the low value for the time interval, and the implied quantity percentage.

2. The method of claim 1, wherein the value axis is a price axis.

3. The method of claim 1, wherein the market data is received from an electronic exchange.

4. The method of claim 1, wherein the market data is received from a gateway device.

5. The method of claim 1, wherein the time interval is a single trading session.

6. The method of claim 1, wherein the time interval is specified by a user.

7. The method of claim 1, wherein the total quantity traded and the implied quantity traded are determined based on last traded quantity and last traded price information in the market data.

8. The method of claim 7, wherein the last traded quantity and the last traded price information in the market data indicates whether a trade was an implied trade or a direct trade.

9. The method of claim 1, wherein the implied quantity percentage is determined to be the implied quantity traded divided by the total quantity traded.

10. The method of claim 1, wherein the indicator is in the shape of a candlestick indicator.

11. The method of claim 1, wherein the indicator represents the implied quantity percentage with shading of the indicator.

12. A non-transitory computer readable medium having stored therein instructions executable by a processor, wherein the instructions are executable to:

display a chart, wherein the chart includes a value axis and a time axis;

receive market data for a tradeable object;

determine an open value for a time interval, a close value for the time interval, a high value for the time interval, and a low value for the time interval based on the received market data;

determine a total quantity traded for the time interval based on the received market data;

determine an implied quantity traded for the time interval based on the received market data;

determine an implied quantity percentage based on the implied quantity traded and the total quantity traded; and display an indicator on the chart in relation to the value axis and the time axis, wherein the indicator represents the open value for the time interval, the close value for the time interval, the high value for the time interval, the low value for the time interval, and the implied quantity percentage.

13. The computer readable medium of claim 12, wherein the value axis is a price axis.

14. The computer readable medium of claim 12, wherein the market data is received from an electronic exchange.

15. The computer readable medium of claim 12, wherein the market data is received from a gateway device.

16. The computer readable medium of claim 12, wherein the time interval is a single trading session.

17. The computer readable medium of claim 12, wherein the time interval is specified by a user.

18. The computer readable medium of claim 12, wherein the total quantity traded and the implied quantity traded are determined based on last traded quantity and last traded price information in the market data.

19. The computer readable medium of claim 18, wherein the last traded quantity and the last traded price information in the market data indicates whether a trade was an implied trade or a direct trade.

20. The computer readable medium of claim 12, wherein the implied quantity percentage is determined to be the implied quantity traded divided by the total quantity traded.

21. The computer readable medium of claim 12, wherein the indicator is in the shape of a candlestick indicator.

22. The computer readable medium of claim 12, wherein the indicator represents the implied quantity percentage with shading of the indicator.

* * * * *